United States Patent [19]

Shimanuki

[11] Patent Number: 4,958,370
[45] Date of Patent: Sep. 18, 1990

[54] CONTROL SYSTEM FOR A PLURALITY OF TELEPHONE SETS

[75] Inventor: Masanobu Shimanuki, Yokohama, Japan

[73] Assignee: Kabushiki Kaisha Toshiba, Kawasaki, Japan

[21] Appl. No.: 177,170

[22] Filed: Apr. 4, 1988

[30] Foreign Application Priority Data

Apr. 3, 1987 [JP] Japan .................................. 62-81085

[51] Int. Cl.⁵ .............................................. H04M 1/00
[52] U.S. Cl. ...................................... 379/157; 379/163; 379/173; 379/183; 379/195; 379/373; 379/393
[58] Field of Search ................ 379/156, 157, 161–164, 379/167, 172, 173, 177, 179, 183, 160, 184, 194, 195, 373, 375, 393

[56] References Cited

U.S. PATENT DOCUMENTS

| | | | |
|---|---|---|---|
| 4,443,664 | 4/1984 | Gange | 379/142 |
| 4,492,822 | 1/1985 | Alderman | 379/393 X |
| 4,636,589 | 1/1987 | Lee | 379/163 X |

FOREIGN PATENT DOCUMENTS 23403  2/1981  European Pat. Off. ............ 379/184

Primary Examiner—Jin F. Ng
Assistant Examiner—Wing F. Chan
Attorney, Agent, or Firm—Finnegan, Henderson, Farabow, Garrett, and Dunner

[57] ABSTRACT

A control system for a plurality of telephone sets connected as branched to a central office line allows extension calling, privacy function setting and hold releasing operations between the telephone sets. Each of the telephone sets in the branched connection comprises keys through which a control data corresponding to a desired control operation is inputted, a transmission circuit for sending to the central office line a control signal corresponding to the control data inputted by the keys, a reception circuit for receiving the control signal from the line, and a control circuit for performing a predetermined control operation on the basis of the control signal received by the reception circuit, whereby the respective operations of the telephone sets are mutually controlled on the basis of the control signal.

12 Claims, 5 Drawing Sheets

CONTROL SYSTEM FOR A PLURALITY OF TELEPHONE SETS

BACKGROUND OF THE INVENTION

1. Field of the Invention

The present invention relates to a control system for a plurality of telephone sets and, more particularly, to a control system for a plurality of telephone sets connected as branched to a central office line which allows extension calling, privacy function setting and hold releasing operations between the telephone sets.

2. Description of the Related Art

Home and business extension telephone systems allowing the extension calling, privacy setting and hold releasing operations between a plurality of telephone sets under the control of, for example, a main unit, have been so far well known. This extension telephone system based on the control of the main unit is arranged so that a plurality of extension telephone sets are connected to the main unit. More specifically, in this arrangement, the extension telephone sets are mutually exchangeably connected under the control of the main unit and the state of the respective extension telephone sets is controlled by a control line signal sent from the main unit.

Further, there has been proposed such an extension telephone system wherein a home telephone controller and/or a private or leased control line and an option controller, in pace of the main unit, are used to realize the speech, privacy speech, calling, automatic hold releasing and transfer functions for each of the telephone sets.

However, this telephone system has had a problem that the system requires the controller similar to the main unit and further the control line for control of the respective telephone sets, which results in increased cost.

In view of such a problem in the prior art, it is an obJect of the present invention to provide a control system for a plurality of telephone sets connected simply as branched, which system allows the realization of the same system functions as those of a prior art extension telephone system.

SUMMARY OF THE INVENTION

In accordance with the present invention, the above object is attained by a control system for a plurality of telephone sets connected as branched to a central office line, each of the telephone sets comprising a means for inputting a control data corresponding to a desired control operation, a means for sending to the central office line a control signal corresponding to the control data inputted to the input means, a means for receiving the control signal on the central office line, and a control means for performing the predetermined control operation on the basis of the control signal received by the receiving means. In the telephone control system of the present invention, when it is desired for any one of the telephone sets in the branched connection to provide a desired control operation to another telephone set, the control signal corresponding to this desired control operation is inputted to the input means of the telephone set yet. This causes the control signal to be sent through the signal receiving means to the control means of the other telephone set, thus realizing the above-mentioned control operation. Therefore, in accordance with the present invention, such a simple arrangement of the telephone sets in the branched connection enables the realization of such system functions as the extension calling, privacy mode setting and hold releasing and functions similar to those of the prior art.

DESCRIPTION OF THE PREFERRED EMBODIMENTS

Embodiments of the present invention will be detailed with reference to the accompanying drawings.

Figure 1:
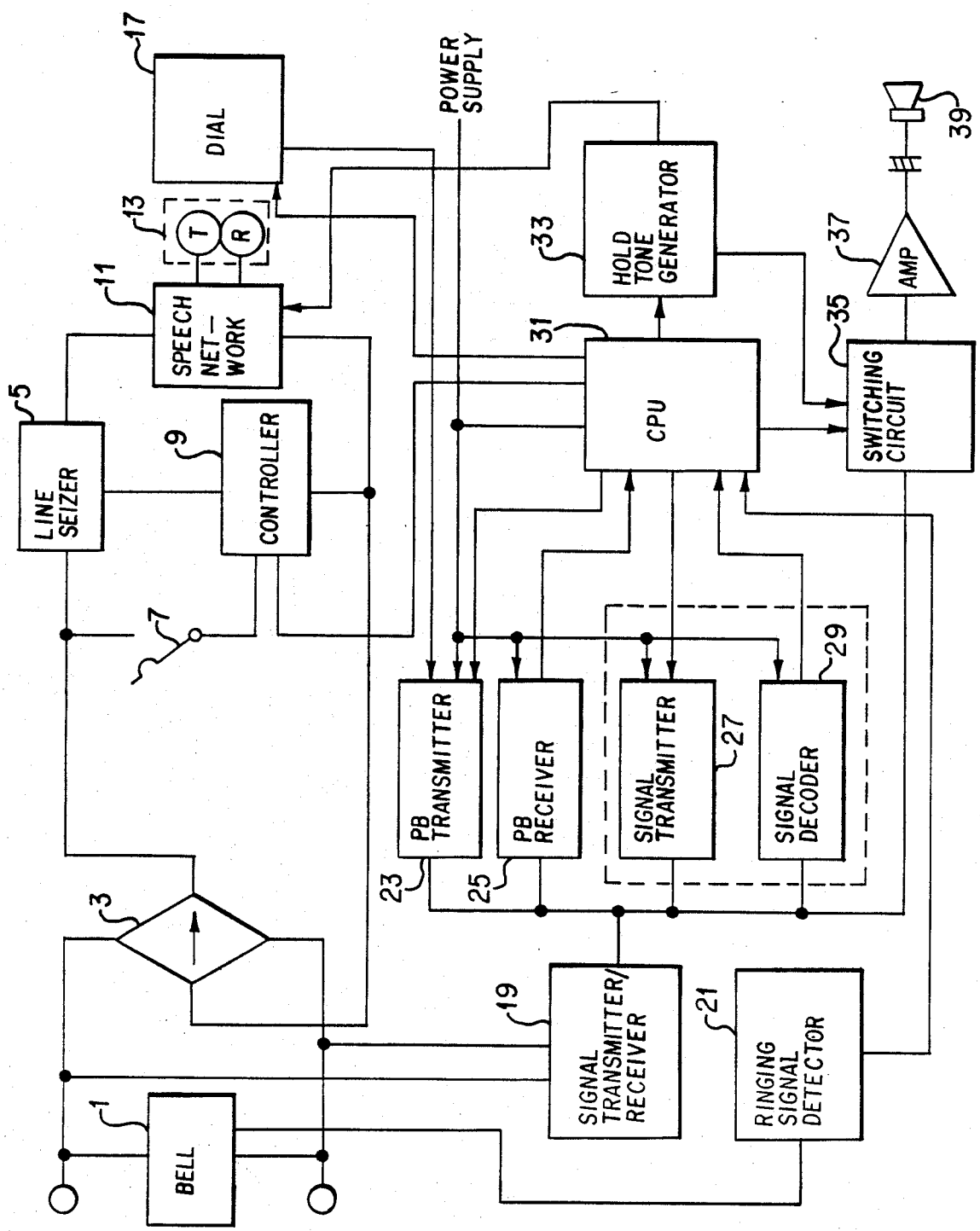
FIG. 1 is a block diagram showing an arrangement of one of a plurality of telephone sets in a control system in accordance with one embodiment of the present invention.

Referring to FIG. 1, there is shown a block diagram of an arrangement of one of the telephone sets used in a control system in accordance with an embodiment of the present invention.

The telephone set of FIG. 1 comprises an electric bell 1, a diode bridge circuit 3, a central-office-line seizing circuit 5, a hook switch 7, a control circuit 9, a speech network 11, a handset 13, a dial 17, a signal transmitter/receiver 19, a ringing-signal detecting circuit 21, a PB signal transmitter 23, a PB signal receiver 25, a central processing unit (which will be sometimes referred to as a CPU, hereinafter) 31, a holding-tone generator 33, a switching circuit 35, an amplifier 37 any a loudspeaker 39.

The bell 1 sounds when receiving an incoming signal from a central office line. The circuit 5 is used to seize a central office line. When the handset 13 is put in its off-hook state, the hook switch 7 is opened. The signal transmitter/receiver 19 functions to transfer signals between the present telephone set and other ones. The circuit 21 is used to detect an incoming signal from the central office line. When the dial 17 is subjected to a predetermined operation, the circuit 23 transmits a PB signal to another telephone set. The receiver 25 receives a PB signal (Dual Tone Multi Frequency) sent from another telephone set. CPU 31 controls the operation of the respective parts. When receiving a signal that is sent from another telephone set and what has an ID number (the address number of the telephone set) coinciding with that of the present telephone set itself, the holding-tone generator 33 generates a holding tone.

Figure 4:
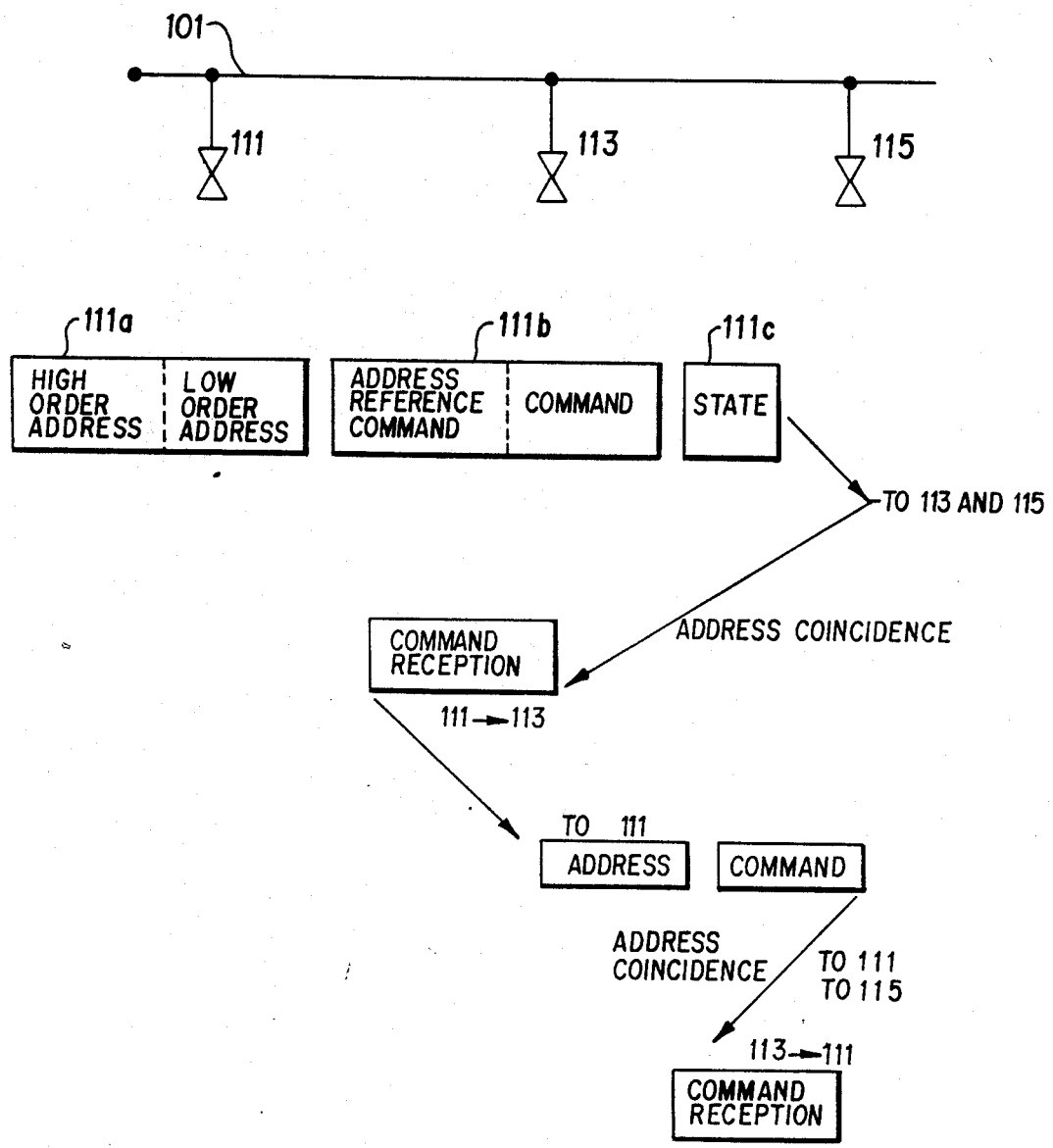
FIG. 4 shows an example of how a control signal is transferred between some of the telephone sets of FIG. 1.

The address number of the telephone set is constituted by an address data 111a which is made up of a higher order address and a lower order address as shown in FIG. 4, which will be described later. When a single telephone set is being designated, both the higher order address and the lower order address are in effect and when plural telephone sets are being designated, only the higher order address is in effect, with the lower order address being not in effect. Whether the lower order address of the address data 111a is made to be in effect or not is determined by an address reference command included in a command data 111b.

The telephone set may further comprises a signal transmitter 27 for sending an analog or digital signal other than the PB signal to another telephone set and a signal decoder 29 for receiving an analog or digital signal other than the PB signal sent from another telephone set, as shown within a broken line in FIG. 1.

Figure 2:
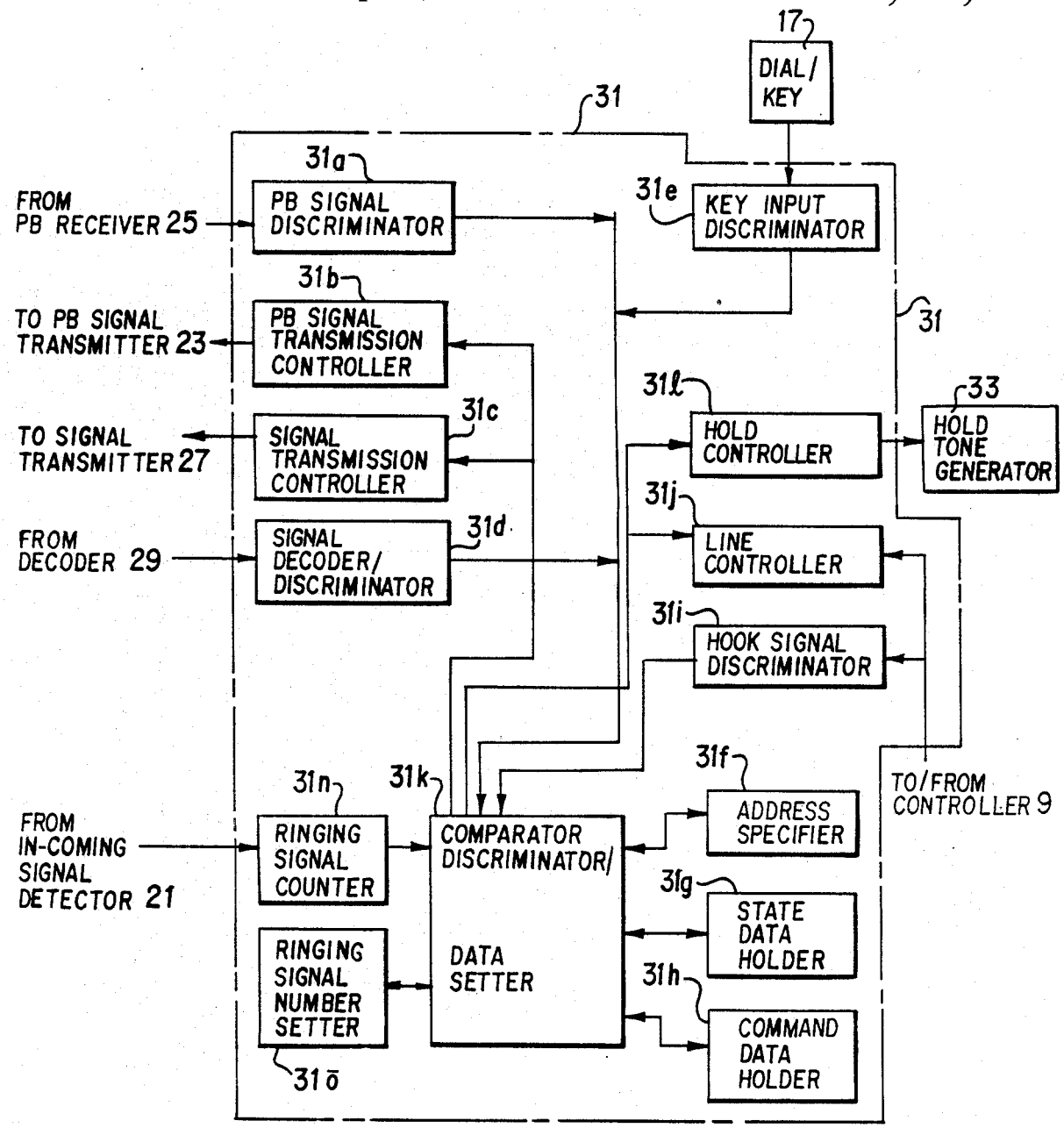
FIG. 2 is a functional block diagram of a central processing unit in FIG. 1.

Shown in FIG. 2 is a functional block diagram of the central processing unit 31, which comprises a means 31a for discriminating the PB signal received at the PB receiver 25, a PB signal transmission control means 31b for controlling the PB signal generated at the PB signal transmitter 23, a signal transmission control means 31c for controlling a signal generated at a signal transmitter 27, and a decoded-signal discriminating means 31d for discriminating an output of the signal decoder 29. The central processing unit 31 further comprises a means 31e for discriminating a key input- through the dial 17, a hold control means 31l for controlling the holding tone generator 33, a line control means 31j for controlling the control unit 9, a means 31i for discriminating a hook signal from the control unit 9, an address specifying means 31f for setting the ID number of the present telephone set, a state data holding means 31g for storing and holding a state data sent from another telephone set and a state data of the present telephone set, a means 31h for storing and holding a command data sent from another telephone set, a ringing-signal counter 31n for counting an output of the ringing-signal detector 21, a ringing signal number setter means 31o for setting the number of ringing signal calls in an automatic reception mode, and a comparison decision/data setting means 31k. The means 31k receives, as its inputs, respective outputs of the PB signal discriminating means 31a, decoded-signal discriminating means 31d, key input discriminating means 31e, address specifying means 31f, state-data holding means 31g, command data holding means 31h, ringing signal counting means 31n and ringing-signal number setting means 31o to set data necessary for the address specifying means 31f, state-data holding means 31g, command data holding means 31h and ringing signal counting means 31n; and sends, as its outputs, necessary control signals to the PB signal transmission control means 31b, signal transmission control means 31c, holding-tone control means 31l and line control means 31i.

Figure 3:
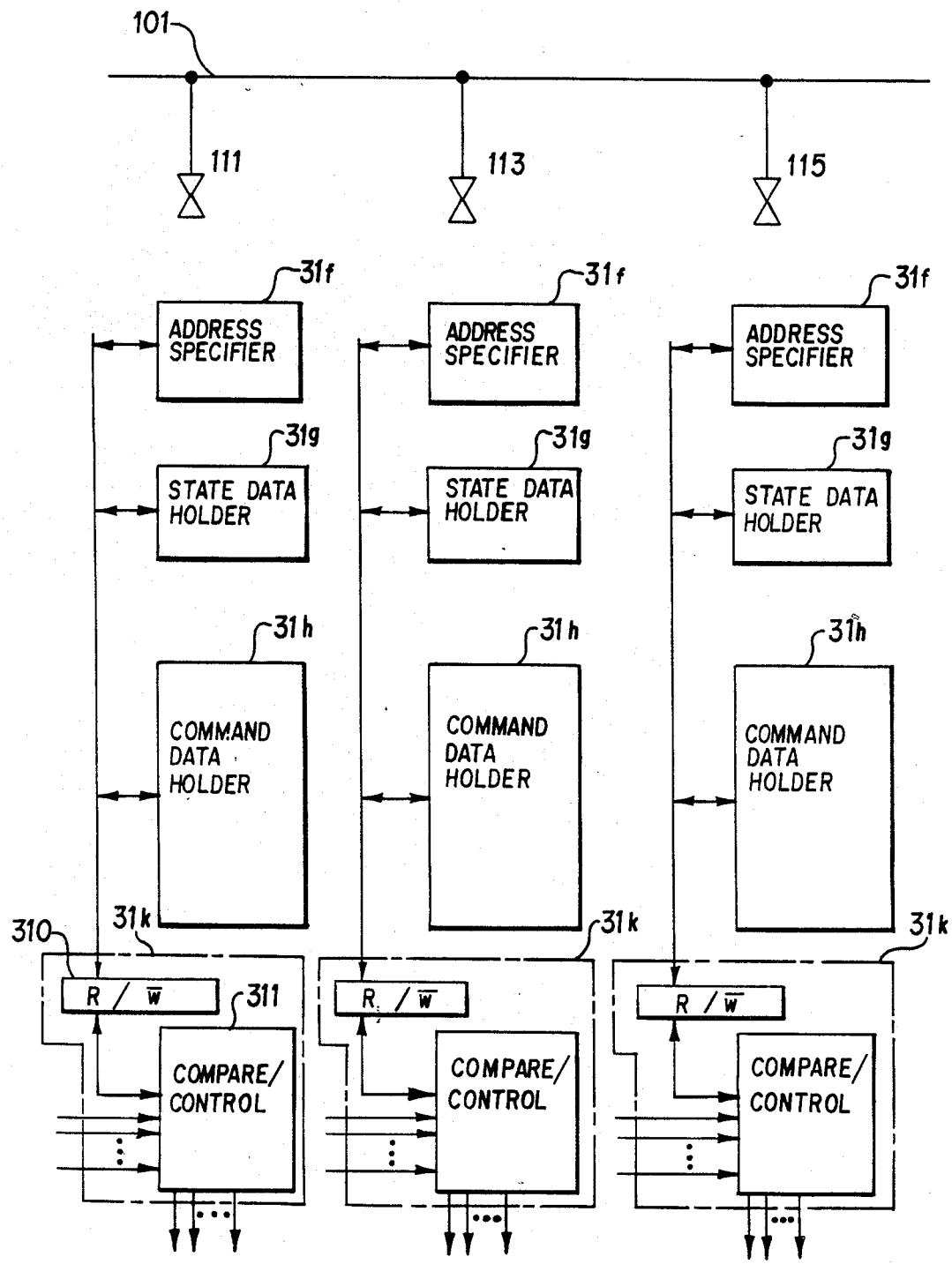
FIG. 3 is a wiring arrangement of a major part of the control system according to the embodiment of the present invention, including major parts of three of the central processing units of FIG. 2.

There is shown in FIG. 3 a wiring arrangement of a major part of the control system according to the embodiment of the present invention which includes major parts of three of the central processing units of FIG. 2. The control system comprises telephone sets 111, 113 and 115 which are directly connected to a central office line 101. Each of the telephone sets 111, 113 and 115 has such an arrangement as shown in FIG. 1. FIG. 3 shows only major functional parts of the central processing unit 31 shown in FIG. 2. That is, the control system of FIG. 3 comprises the means 31f for setting an ID number or address, the means 31g for storing and holding a state data sent from another telephone set and a state data of the telephone set itself, the means 31h for storing and holding a command data sent from another telephone set, and the comparison decision/data setting means 31k, as already explained in connection with FIG. 2. The comparison decision/data setting means 31k comprises a read/write means 310 for reading and writing data from and into the address setting means 31f, state-data holding means 31g and command data holding means 31h as well as a comparison means 311 for comparing its input data with the data held at the address setting means 31f, state-data holding means 31g and command data holding means 31h. The comparison decision/data setting means 31k functions to output necessary control signals to the PB signal transmission control means 31b and the signal transmission control means 31c by referring to the contents stored in the address specifying means 31f, state-data holding means 31g and command data holding means 31h on the basis of the output of the key input discriminating means 31e; and also sends necessary control signals to the holding-tone control means 31l and the line control means 31j by referring to the contents stored in the address specifying means 31f, state data holding means 31g and command data holding means 31h on the basis of the outputs of the PB signal discriminating means 31a and decoded-signal discriminating means 31d.

FIG. 4 shows an example of how a control signal is transferred between the respective telephone sets in the present embodiment. For example, when a predetermined command s sent from the telephone set 111 to the telephone set 113, an address data 111a indicative of the ID number of the party telephone set 113, a command data 111b indicative of the control contents and a state data 111c indicative of the state and address or own ID number of the telephone set itself are sent to the party telephone set in this order The address data 111a is constituted of a higher order address and a lower order address. The command data 111b includes the address reference command which commands whether the lower order address of the address data 111a is made to be in effect or not. In this embodiment, when the lower order address is made to be in effect by the address reference command, the higher order and the lower order addresses determine a single telephone set, and when the lower order address is made to be not in effect, plural telephone sets, i.e., the telephone sets 113 and 115, which are determined by the higher order address, are designated. These data are sent in the form of a PB signal or another analog or digital signal. Such a signal can be sent to the telephone sets 113 and 115 at the same time, but the telephone set 115 cannot accept the signal because it is different in the address data from the telephone set 111. Then the telephone set 113 sends a predetermined command data attached with the ID number of the telephone set 111. In this case, this command data can be sent to the telephone sets 111 and 115 at the same time, but can be accepted only at the telephone set 111 because of the coincidence of their ID number.

Next, the operation of the present embodiment will be explained.

When there is an incoming signal from the central office line 101, the incoming signal data is sent to the telephone sets 111, 113 and 115. The bell 1 of the telephone set 111 sounds. When the operator picks up the handset 13, the hook switch 7 is opened so that the control unit 9 drives the line seizing circuit 5 to seize the central office line. And the operator can have a conversation with the party through the handset 13, speech network 11 and central office line.

First, explanation will be made as to a so-called extension calling operation wherein a call of an incoming signal from the central office line is sent to the telephone set 113. When it is desired to execute the extension calling operation, the dial 17 is operated to input the ID number of the telephone set 113. This ID number input causes an address data corresponding to this ID number, a command data indicative of extension calling and a data indicative of its own state to be sent in the form of a PB signal from the PB signal transmitter 23 through the signal transmitter/receiver 19 to the telephone set 113. The telephone set 113 accepts the PB signal through the signal transmitter/receiver 19 and the PB signal receiver 35 and sends it to the CPU 31. The CPU 31 compares the received PB signal with its own ID number. If coincidence is found between the ID numbers, then the switching circuit 35 is shifted to the side of the holding-tone generator 33. Accordingly, the generator 33 generates a holding tone and sends it through the switching circuit 35 and the amplifier 37 to the loudspeaker 39 which in turn issues the holding tone. Listening to the holding tone, the operator of the telephone set 113 picks up the handset 13 and can have a conversation with the party through the central office line.

In this connection, the invention is not limited to the use of the PB signal, and the operation of the special key on the dial 17 may cause the CPU 31 to drive the signal transmitter 27, thus sending a control signal for an extension calling function to the telephone set 113. In the latter case, in the telephone set 113, the signal decoder 29 detects the transmitted signal and transfers it to the CPU 31, which results in a holding tone being generated and a conversation is achieved between the telephone set 113 and the party telephone set leading to the central office line, in the same manner as mentioned above.

Explanation will next be made as to how to set a privacy function. For example, when it is desired to inhibit the telephone sets 113 and 115 other than the telephone set 111 from having a conversation with the central office or outside line during the conversation of the telephone set 111 with the outside line, that is, when it is desired to set the privacy function, the telephone set 111 sends, during its conversation, a predetermined control signal including a data indicative of the ID numbers or addresses of the party telephone sets and a data indicative of the setting of the privacy function, to the telephone sets 113 and 115. Thereby, the CPU's 31 of, for example, the telephone sets 113 and 115 are controlled to put their control circuits 9 in an inhibit state, activating the privacy function. In this case, if the off-hook of the telephone set is arranged to cause the telephone to automatically send the aforementioned predetermined signal, then an automatic privacy function can be realized. When it is desired to release the privacy function, for example, when the conversation of the telephone set 111 ends, a privacy-function releasing signal may be sent from the telephone set 111 to the telephone sets 113 and 115.

Alteratively, a control signal may be sent from a specific telephone set to other telephone sets during The off period of a calling pulse signal to control the control units 9 of the other telephone sets, with the result that the other telephone sets will not seize the line 101, thus realizing the privacy function.

Next, explanation will be made as to how to automatically release the holding state of a specific telephone set through an off-hook operation of another telephone set. When the telephone set 111 is in its holding state and the telephone set 113 or 115 is picked up, i.e., put in the off-hook state, a control signal including a hold releasing instruction is automatically sent from the telephone yet 113 or 115 to the telephone set 111, thus automatically releasing the hold state of the telephone set 11.

In this way, the present embodiment, which is not separately provided with a special control system unlike the prior art, can exhibit the same system functions as those of the prior art.

Although the above explanation has been made in the foregoing embodiment as to the control of the extension calling, privacy setting and hold releasing functions between the telephone sets 111, 113 and 115 mutually connected as branched, such calling control may also be possible that any one of the telephone sets 111, 113 and 115 in the branch connection is specified and called by a telephone set other than the telephone sets 111, 113 and 115 through the line 101. For example, explanation will be made as to how one 115 of the telephone sets 111, 113 and 115 is specified and called by another telephone set. First, the telephone sets 111, 113 and 115 in the branch connection are called by another telephone set, whereby the ringing-signal detecting circuits 21 of the telephone sets 11, 113 and 115 al detect an incoming signal. The ringing-signal counting means 31n (refer to FIG. 2) of the central processing unit 31 counts ay output of the detector 21 and when the counted value reaches a predetermined level set by the ringing-signal number setter 31o, the counting means 31n is caused to control the line controlling means 31j for automatic signal reception. Thereafter, another telephone set sends a predetermined control signal which comprises, for example, a PB signal, with the result that the control signal causes a specific telephone set, in this case the telephone set 115 alone, to seize the line and also causes the other telephone sets 111 and 113 to release the line. As a result, only the telephone set 115 can be called by means of a holding tone or a sound.

As described above, the global polling can be made for plural telephone sets connected as branched to the office line by making the lower order address not in effect, and the individual polling can be made for a single telephone set connected as branched to the office line by making the lower order address in effect.

Figure 5:
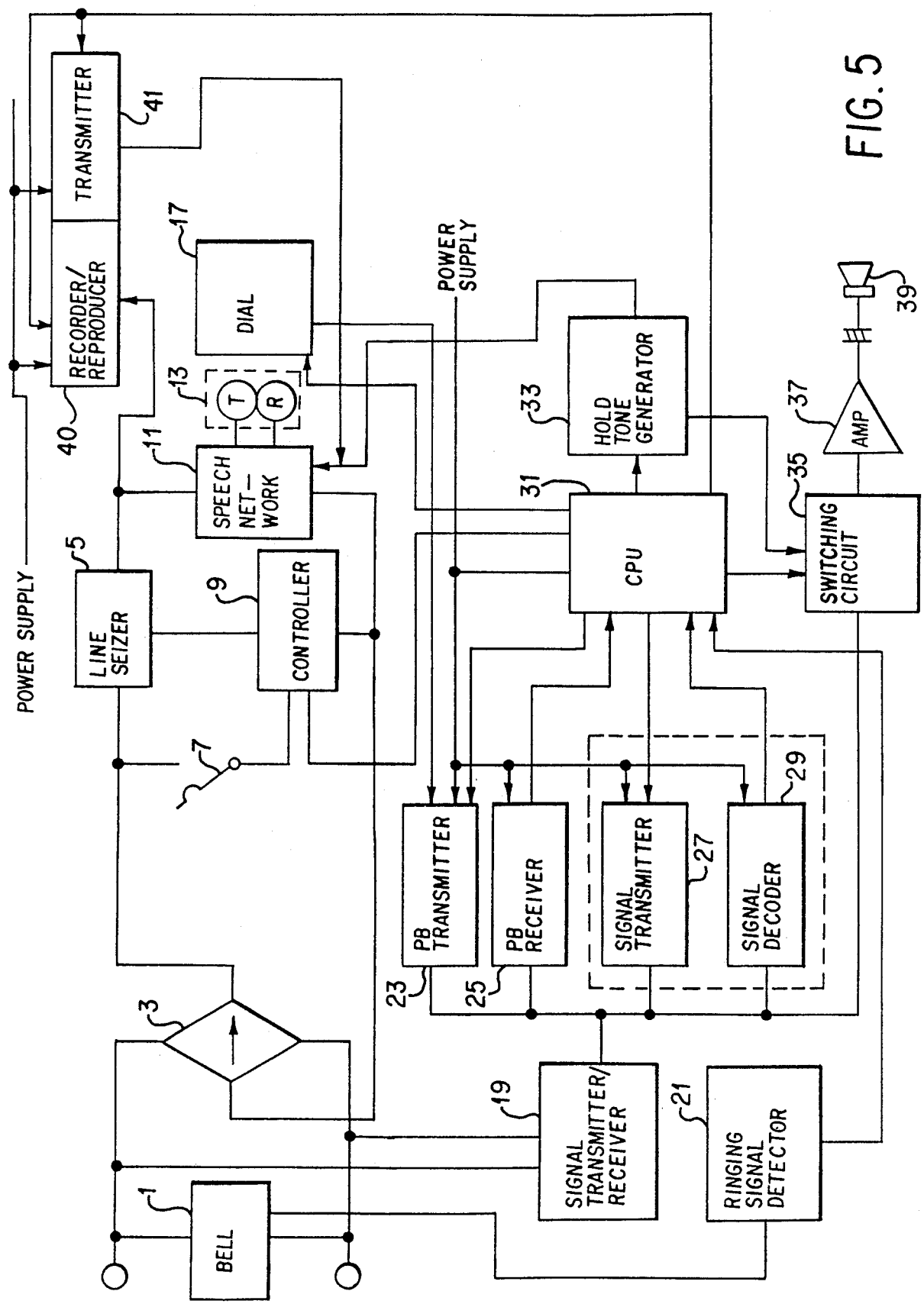
FIG. 5 is a block diagram of an arrangement of one of a plurality of telephone sets used in a control system of another embodiment of the present invention.

Referring to FIG. 5, there is shown one of a plurality of telephone sets which are used in a control system of another embodiment of the present invention and which each have an automatic answering function. In the present embodiment, in addition to the arrangement shown in FIG. 1, a means 40 for recording and reproducing a voice signal from a central office line and a means 41 for sending the voice signal onto the line are newly added. In accordance with the present embodiment, the aforementioned calling function of a specific telephone set is utilized and a predetermined control signal is sent from another telephone set so that a message can be controllably stored in or read out from the specific telephone set.

What is claimed is:

1. A control system for a plurality of telephone sets connected as branched at one end to a central office line, each of the telephone sets being defined as a predetermined telephone set and comprising:

control information inputting means for inputting a control information data sequence indicative of a request to other telephone sets connected as branched to the central office line to perform a desired control operation and indicative of at least one of the other telephone sets of said plurality of telephone sets being requested;

control signal sending means for sending to the central office line an output control signal for controlling the other telephone sets connected as branched to the central office line corresponding to the control information data sequence inputted into the control information inputting means;

control signal receiving means for receiving an input control signal sent from any other one of said telephone sets via the central office line; and control means for performing a predetermined operation corresponding to a control information data sequence contained in the input control signal received by the control signal receiving means.

2. A control system according to claim 1, wherein the information inputting means inputs desired control information data in accordance with a predetermined operation of a dial key.

3. A control system according to claim 1, wherein the control signal sending means sends an output control signal comprising a DTMF signal to the central office line.

4. A control system according to claim 1, wherein the control signal sending means sends to the central office line an output control signal comprising an analog signal.

5. A control system according to claim 1, wherein the control signal sending means sends to the central office line an output control signal comprising a digital signal.

6. A control system according to claim 1, wherein the control signal receiving means has DTMF signal receiving means for receiving a DTMF signal sent from the central office line and for analyzing the received DTMF signal.

7. A control system according to claim 1, wherein the control signal receiving means has signal decoder means for receiving an analog signal sent from the central office line and for analyzing the received signal.

8. A control system according to claim 1, wherein the control signal receiving means has signal decoder means for receiving a digital signal sent from the central office line and for analyzing the received signal.

9. A plurality of telephone sets connected as branched to a central office line, each of the telephone sets being defined as a predetermined telephone set and comprising:

control information inputting means for inputting control information data indicative of a request to other telephone sets connected as branched to the central office line to perform a desired control operation;

control signal sending means for sending to the central office line an output control signal for controlling the other telephone sets connected as branched to the central office line corresponding to the control information data inputted into the control information inputting means;

control signal receiving means for receiving an input control signal sent from the central office line; and control means for performing a predetermined operation corresponding to the input control signal received by the control signal receiving means; and wherein the control signal sending means sends an output control signal including an identification code of a destination party telephone set to the central office line, and the control signal receiving means renders effective the received input control signal only when the identification code included in the received input control signal coincides with an identification code of the telephone set receiving the input control signal.

10. A control system for a plurality of telephone sets connected as branched to a central office line, each of the telephone sets being defined as a predetermined telephone set and comprising:

control information inputting means for inputting control information data indicative of a request to other telephone sets connected as branched to the central office line to perform a desired control operation;

control signal sending means for sending to the central office line an output control signal for controlling the other telephone sets connected as branched to the central office line corresponding to the control information data inputted into the control information inputting means;

control signal receiving means for receiving an input control signal sent from the central office line; and control means for performing a predetermined operation corresponding to the input control signal received by the control signal receiving means; and wherein the control signal sending means sends an output control signal including at least an identification code to identify a destination party telephone set, command information indicative of a control command to the destination party telephone set, and information indicative of a state of the telephone set sending the output control signal.

11. A control system for a plurality of telephone sets connected as branched to a central office line, each of the telephone sets being defined as a predetermined telephone set and comprising:

control information inputting means for inputting control information data indicative of a request to other telephone sets connected as branched to the central office line to perform a desired control operation;

control signal sending means for sending to the central office line an output control signal for controlling the other telephone sets connected as branched to the central office line corresponding to the control information data inputted into the control information inputting means;

control signal receiving means for receiving an input control signal sent from the central office line; and control means for performing a predetermined operation corresponding to the input control signal received by the control signal receiving means; and wherein the input control signal sent from the central office line includes an identification code of a specific telephone set and information indicative of a command to call the specific telephone set, and the control means causes the telephone set receiving the input control signal to generate a calling tone only when the identification code included in the received input control signal coincides with an identification code of the telephone set receiving the control input signal.

12. A control system for a plurality of telephone sets connected as branched to a central office line, each of the telephone sets being defined as a predetermined telephone set and comprising:

control information inputting means for inputting control information data indicative of a request to other telephone sets connected as branched to the central office line to perform a desired control operation;

control signal sending means for sending to the central office line an output control signal for controlling the other telephone sets connected as branched to the central office line corresponding to the control information data inputted into the control information inputting means;

control signal receiving means for receiving an input control signal sent from the central office line; and control means for performing a predetermined operation corresponding to the input control signal received by the control signal receiving means; and wherein the input control signal sent from the central office line includes an identification code of a specific telephone set and information indicative of a command to set the specific telephone set to a privacy mode, and the control means sets the telephone set receiving the input control signal to the privacy mode when the identification code included in the received input control signal coincides with an identification code of the telephone set receiving the input control signal.

* * * * *